No. 872,559. PATENTED DEC. 3, 1907.
F. EICHBERG.
ALTERNATING CURRENT MOTOR.
APPLICATION FILED DEC. 18, 1905.
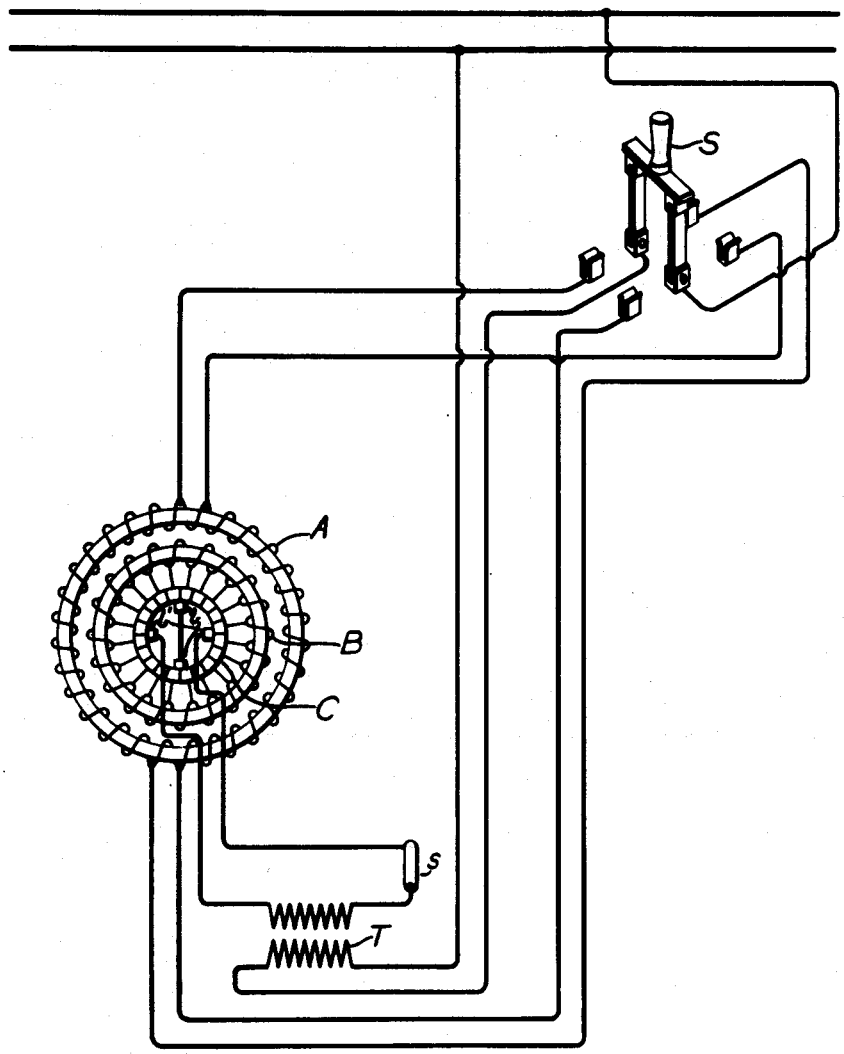
Witnesses: Inventor:
Friedrich Eichberg
by Albert G. Davis
Att'y.

UNITED STATES PATENT OFFICE.

FRIEDRICH EICHBERG, OF BERLIN, GERMANY, ASSIGNOR TO GENERAL ELECTRIC COMPANY, A CORPORATION OF NEW YORK.

ALTERNATING-CURRENT MOTOR.

No. 872,559.   Specification of Letters Patent.   Patented Dec. 3, 1907.

Application filed December 18, 1905. Serial No. 292,129.

*To all whom it may concern:*

Be it known that I, FRIEDRICH EICHBERG, a subject of the Emperor of Austria-Hungary, residing at Berlin, Germany, have invented certain new and useful Improvements in Alternating-Current Motors, of which the following is a specification.

My invention relates to the control of alternating-current motors of a type described in former applications filed by G. Winter and myself, in which the armature is provided with a commutator and brushes which short-circuit the armature on the line of primary magnetization, while a field is produced in the motor by suitable connections from the source of current to points displaced ninety electrical degrees from the line of primary magnetization and the armature short-circuit. These connections may be made through brushes bearing on the commutator displaced ninety electrical degrees from the short-circuiting brushes, or they may be made to points similarly positioned on the stator winding. The particular arrangement of these connections for producing the field at right-angles to the line of the armature short-circuit is immaterial as regards my present invention.

My invention relates to starting motors of this type. I have found that while small motors of this type may be connected directly to the source while at rest, this method of starting in the case of large motors produces a heavy current-flow, since at starting there is no counter-electromotive force of rotation but only of self-induction, so that the armature short-circuit acts practically to short-circuit the primary winding at the points of supply, and consequently auxiliary devices must be relied upon for preventing excessive flow of current.

My invention consists in starting motors of this type by producing a displacement between the line of primary magnetization and the armature short-circuit. As a result of this displacement the short-circuited portions of the armature are not in inductive relation to the entire primary winding and the remaining portions of the primary winding serve as inductances to keep down the starting current. At starting the connections for supplying the field displaced ninety degrees from the armature short-circuit may either be left closed or be broken. Then when the motor is up to speed these connections if open are closed and the primary magnetization and armature short-circuit are brought back into line with each other.

My invention will best be understood by reference to the accompanying drawing, which shows diagrammatically one arrangement of apparatus with which a motor may be controlled in accordance with my invention.

In the drawing A represents the stator which is adapted for connection to a single-phase source through the switch S.

B represents the armature which is provided with a commutator C and two sets of commutator brushes. One set $b\ b$ is connected to short-circuit the armature on the line of primary magnetization, while the other set $b'$ is displaced ninety degrees from the first set, and is connected to a suitable source of current for producing a field in the motor displaced substantially ninety degrees from the line of primary magnetization and the armature short-circuit. The source of current for this cross-field is shown as a transformer T, the primary of which is in circuit with the primary motor circuit, while the secondary is connected to the brushes $b'\ b'$. By means of a switch $s$ placed in the secondary circuit of the transformer the connections for producing the cross-field in the motor may be broken. The stator winding A in addition to the usual set of taps in line with the armature brushes $b\ b$, has a second set of taps displaced from this line and connected to one side of the double-throw switch S. When the switch S is thrown so as to connect these auxiliary terminals to the line the primary magnetization is displaced from the line of the rotor short-circuit and the motor will accordingly start like an ordinary repulsion motor. The portion of the winding, *i. e.*—the portion between the auxiliary starting terminals and the line of the motor brushes is not in inductive relation to the short-circuited armature, and consequently these portions act at starting as inductances in the primary circuit to keep down the flow of primary current. Since the motor starts as a repulsion motor, the cross-field is not required, and consequently the switch $s$ may be open at starting so that the primary of transformer T acts as a choke-coil in the motor circuit to reduce further the starting current. Of course, if the secondary circuit of the series transformer is to be thus broken at starting, the transformer should be so designed as not to produce an excessive rise of voltage at the secondary terminals when open-circuited. After the motor is up to speed the switch s is closed, if it has been opened at starting, and the switch S is thrown over to its other position so as to connect the source of current to the main primary terminals in line with the armature brushes $b$ $b$. The motor then operates in the usual manner.

It is obvious that it makes no difference in the operation of the motor whether the displacement between the primary magnetization and armature short-circuit at starting is obtained by shifting one or the other. In other words the effect produced is exactly the same if, instead of shifting the points of connection of the source to the primary winding, the armature brushes are shifted. Consequently my method of control may be carried out in either way.

What I claim as new, and desire to secure by Letters Patent of the United States, is,—

1. The method of operating a single-phase motor of the commutator type which consists in starting the motor by short-circuiting the armature through brushes displaced from the line of primary magnetization and supplying to the armature through brushes displaced substantially ninety electrical degrees from the short-circuiting brushes a current adapted to produce a magnetic field displaced from the primary magnetization and after the motor is up to speed bringing the armature short-circuit and primary magnetization into line.

2. The method of operating a single-phase motor of the commutator type having two sets of brushes displaced from each other by approximately ninety electrical degrees, which consists in starting the motor by short-circuiting the armature through one set of brushes on a line displaced from the primary magnetization and supplying to the other set of brushes current adapted to produce a field displaced from the primary magnetization and after the motor is up to speed bringing the armature short-circuit and the primary magnetization into line.

In witness whereof, I have hereunto set my hand this twenty-first day of November, 1905.

FRIEDRICH EICHBERG.

Witnesses:
 VOHUN SINGER,
 MAX HANDLEY.